United States Patent [19]

Freller et al.

[11] 3,920,860

[45] Nov. 18, 1975

[54] METHOD FOR PRODUCING MIXED CRYSTAL LAYERS FROM CDS AND CDSE

[75] Inventors: Helmut Freller; Brigitte Bauer, both of Nurnberg, Germany

[73] Assignee: Siemens Aktiengesellschaft, Munich, Erlangen, Berlin, Germany

[22] Filed: Jan. 7, 1974

[21] Appl. No.: 431,577

Related U.S. Application Data

[63] Continuation of Ser. No. 76,320, Sept. 28, 1970, abandoned.

[52] U.S. Cl.................................. 427/87; 427/126
[51] Int. Cl.$^2$............................................ B44D 1/18
[58] Field of Search............. 117/106 R, 106 A, 215, 117/201

[56] References Cited
UNITED STATES PATENTS

| | | | |
|---|---|---|---|
| 3,323,027 | 5/1967 | Braniecki, Jr.................. | 317/234 R |
| 3,496,024 | 2/1970 | Ruehrwein............................ | 136/89 |
| 3,565,686 | 2/1971 | Babcock et al................. | 117/106 R |
| 3,642,529 | 2/1972 | Lee et al......................... | 117/106 R |

*Primary Examiner*—Cameron K. Weiffenbach
*Attorney, Agent, or Firm*—Herbert L. Lerner

[57] ABSTRACT

A method of producing mixed crystal layers of the composition $CdS_xSe_{1-x}$ with $0<x<1$ by evaporation of individual elements from three separate crucibles and subsequent precipitation upon a collector, in high vacuum. The collector temperature $T_4$ is between 120° and 400°C. The desired composition of the mixed crystal layer is adjusted solely by changing the ratio of the crucible temperature $T_2$ of the sulfur vaporizer to the crucible temperature $T_3$ of the selenium vaporizer, at a constant crucible temperature $T_1$ of the cadmium vaporizer and constant collector temperature $T_4$.

3 Claims, No Drawings

METHOD FOR PRODUCING MIXED CRYSTAL LAYERS FROM CDS AND CDSE

This is a continuation of application Ser. No. 76,320, filed Sept. 28, 1970, now abandoned.

BACKGROUND OF THE INVENTION

1. Field of the Invention

The invention relates to a method for producing mixed crystal layers of CdS and CdSe of composition $CdS_xSe_{1-x}$ with $0<x<1$, by evaporation of individual elements from three separate crucibles and subsequently precipitating upon a collector, in high vacuum.

2. Description of the Prior Art

Vapor deposition layers, which consist of mixed crystals of the compound semiconductors CdS and CdSe, with arbitrary transmission-absorption behavior in the wave length range 0.50 to 0.72 $\mu$m, are used for optical filters, as well as for active layers for radiation converters, such as solar cells in the abovementioned wave length range.

Production methods for such vapor deposition layers are known. In most of these methods, one starts with the original compounds, or with already solid solutions or with pulverized mixtures of two such compounds. Thus, for example, CdS:CdSe mixed crystals are produced through evaporation of the desired mixture, at temperatures around 950° to 1000°C (Japanese Journal of Applied Physics. Vol. 4, NO. 11, November 1965, p. 839 ff).

These methods have various disadvantages. For example, during direct vaporization, the volatile components, e.g. sulfur, may escape so that they are no longer present in the consensate, in their original stoichiometric condition. This results in non-homogenous strongly straying layers, with a flat absorption edge and stoichiometric shortcomings. Satisfactory results may be obtained by an after-treatment of the vapor deposition layers, at temperatures around 500°C or by time consuming pre-processing of the vaporization material. Moreover, each desired layer composition, requires the preparation of storage of an appropriate material.

A method is also known, whereby the mixed layers are obtained by vapor deposition of the individual elements from separate crucibles and by the precipitation on a cold carrier. This, also, requires an after treatment at about 500°C in order to homogenize the layer. In order to effect a vapor deposition of various two-component compounds semiconductor layers, it had been attempted to evaporate the individual components out of separate crucibles and to obtain the stoichiometry of the condensed layers, by force, with appropriate condensation temperatures.

SUMMARY OF THE INVENTION

By contrast, three components are present on the condensation surface during the production of mixed crystal layers of CdS and CdSe, said components having variable binding energy. During the production of such mixed crystal layers, one must not merely avoid the occurrence of non-saturated particles in the individual elements of the layer, but the ratio of the molecules of one compound to the molecules of the other compound, must possess defined values within the wide interval of interest.

The object of our invention is to meet the above criteria.

According to our invention, the collector temperature $T_4$ is selected between 120° and 400°C, and that the desired composition is adjusted solely by changing the ratio of the crucible temperature $T_2$ (S vaporizer) to the crucible temperature $T_3$ (Se vaporizer), at a constant crucible temperature $T_1$ (Cd vaporizer) and constant collector temperature $T_4$.

Glass and ceramic are particularly suitable materials for the collector.

According to the invention, the condensation temperature $T_4$ at the collector is to be so selected that the condensation of un-saturated portion of the more volatile component or components, such as Se or S, in the case of Cd (S:Se) is eliminated. In normal vaporization speeds, this range for $T_4$, for example for CdSe, is between 100° and 200°C and for CdS between 120° to 300°C. Thus, a condensation temperature for Cd (S:Se) mixed crystal layers could be selected in the temperature interval, between approximately 120° and 200°C, for the collector temperature $T_4$.

It was surprisingly found, however, that Cd(S:Se) mixed crystal layers could be precipitated even at condensation temperatures above 200° to about 400°C. X-ray structure analyses (Debye-Scherrer) have shown that no excess of one of the original elements is found in all the condensation ranges of 120° to 400°C, in addition to CdSe reflexes.

PREFERRED EMBODIMENTS

The invention will be disclosed in greater detail on hand of some embodiment examples. For the sake of better clarity, the required temperatures for $T_1$ to $T_4$ have been compiled in the following Table for the production of Cd(S:Se) mixed crystal layers, for five various compositions. A glass plate was used as a collector. The vapor deposition took place in a closed evacuated vessel at a pressure of $5\cdot10^{-5}$ Torr. The respective vapor deposition process lasted 6 minutes. The composition of the resulting mixed crystal layers was determined with optical measuring. The Table shows that the composition of the formed mixed crystal layers is influence at constant condensation temperature $T_4$ only by temperature $T_3$ or the selenium vaporizer, which is the only temperature that is kept variable here. An increase in temperature $T_4$ (Example 5) causes a change in the composition of the layer at otherwise equal temperatures $T_1$ to $T_3$, as in Example 2.

TABLE

| Example | $T_1[Cd]/°C$ | $T_2[S]/°C$ | $T_3[Se]/°C$ | $T_4/°C$ | Composition of the layer |
|---|---|---|---|---|---|
| 1 | 360 | 100 | 180 | 200 | $CdS_{0.9}Se_{0.1}$ |
| 2 | 360 | 100 | 190 | 200 | $CdS_{0.8}Se_{0.2}$ |
| 3 | 360 | 100 | 200 | 200 | $CdS_{0.6}Se_{0.4}$ |
| 4 | 360 | 100 | 210 | 200 | $CdS_{0.35}Se_{0.65}$ |
| 5 | 360 | 100 | 190 | 340 | $CdS_{0.85}Se_{0.15}$ |

With the aid of the method according to the invention, photo resistances, for example, can be produced which have almost the same sensitivity in the entire range of 5100 to 7200 A. If, for example, the temperature $T_1$ of the cadmium evaporator is constantly kept at 360°C and the temperature $T_4$ of the collector is constantly maintained at 200°C, and if the temperature $T_2$ of the selenium vaporizer is increased within 15 minutes from room temperature to 100°C and, if within the same time period, the temperature $T_3$ of the selenium vaporizer is reduced from 250°C to room temperatures, mixed crystal vapor deposited layers may be produced thereby whose lowermost layer is CdSe and whose uppermost layer of CdS, while the intermediate layers consist, depending on their height, of Cd(S:Se) mixed crystal layers, of various composition.

We claim:

1. A method of producing layers of crystals having the overall composition of $CdS_xSe_{1-x}$, wherein $0<x<1$, through a vaporization of the individual elements Cd, S, and Se from three separate crucibles and subsequent precipitation upon a collector in high vacuum in the absence of a carrier gas, which comprises maintaining a collector temperature between 120° and 400°C and adjusting the composition of each crystal layer being precipitated as desired, by changing the ratio of the crucible temperature $T_2$ for the S vaporizer to the crucible temperature $T_3$ for the Se vaporizer while holding the crucible temperature $T_1$ for the Cd Vaporizer and the collector temperature $T_4$ constant.

2. The method of claim 1, wherein the individual elements are precipitated on a collector consisting of glass or ceramic.

3. The method of claim 2, wherein layers CdSe, $CdS_xSe_{1-x}$ and CdS wherein $0<x<1$ are sequentially produced by holding $T_1$ at 360°C and $T_4$ at 200°C while increasing $T_2$ within 15 minutes from room temperature to 100°C while simultaneously reducing $T_3$ from 250°C to room temperature.

* * * * *